Ritz & Carter.
Shingle Mach.
Nº 91,872.  Patented Jun. 29, 1869.
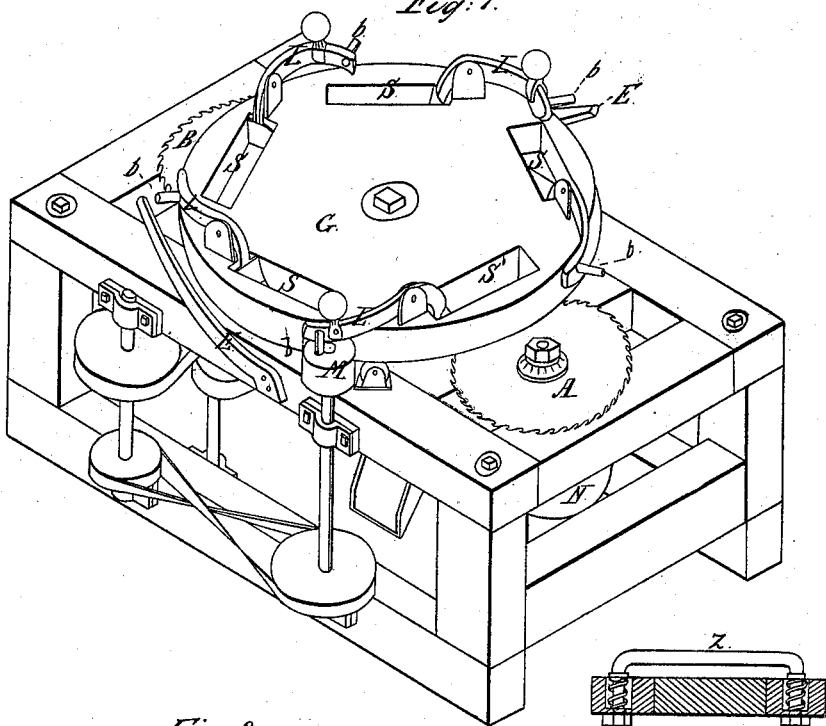
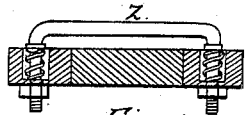
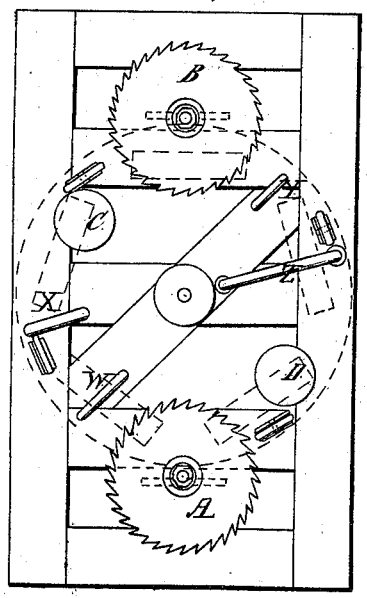
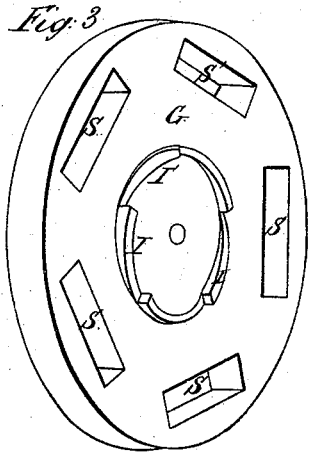
Witnesses
Isaac Stephens
Joseph Ridge
Inventors
Adam G. Ritz
John B. Carter
per Artemus Roberts
Atty

United States Patent Office.

ADAM G. RITZ, OF ELIZABETHTOWN, AND JOHN B. CARTER, OF HEARTSVILLE, INDIANA.

Letters Patent No. 91,872, dated June 29, 1869.

IMPROVEMENT IN SHINGLE-MACHINE.

The Schedule referred to in these Letters Patent and making part of the same.

*To all whom it may concern:*

Be it known that we, ADAM G. RITZ, of Elizabethtown, in the county of Bartholomew, and State of Indiana, and JOHN B. CARTER, of Heartsville, in the county and State above mentioned, have invented certain new and useful Improvements in Shingle-Machines, and especially upon a shingle-machine for which we did obtain Letters Patent bearing date March 24, 1868; and we do hereby declare that the following is a full and exact description of our several improvements, reference being had to the accompanying drawings, making a part of this specification.

The nature of our invention relates to a novel method of adjusting the blocks in order that the saws may cut alternate buts and points.

To enable others skilled in the art to make and use our invention, we will proceed to describe the same with reference to the drawings, in which—

Figure 1 is a perspective view of our improved machine, and

Figure 2 is a plan view of the upper portion of the same, with the block-carriage removed.

Figure 3 represents the rotary block-carriage, and

Figure 4 is a sectional view, showing the construction of a spring-stirrup used in adjusting the blocks.

Power is communicated to the main pulley, N, and from it, by means of appropriate belts and pulleys, to the circular saws A B and planers C D; also, by means of a friction-pulley, M, or suitable cog-gearing, to the rotary block-carriage G.

Blocks, of suitable length, from which shingles are to be made, are placed in the openings S S', &c., in the block-carriage G, and secured by means of the dogs, L L', &c.

The dogs are provided with pins $b$ $b'$, &c., that impinge upon the inclined arms E E', by which they are slightly raised, and the blocks released.

Below the block-carriage are situated adjustable stirrups W X Y, and an adjustable spring-stirrup, Z.

When the shingle-blocks are released by the dogs L L', &c., as above described, they fall upon a pair of these stirrups, and are adjusted ready for the next planer and saw.

The stirrup Z is provided with spiral springs, as shown in fig. 4, that allow it to be depressed by the several inclined planes I I', &c., situated on the under side of the block-carriage.

The object of this arrangement is to provide for the undisturbed passage of the butt of the shingle over the stirrup that adjusted the block for the point; as, for example, when a block has passed the saw B, its under surface will be in a horizontal plane. The next shingle is to be sawn from the point, and in order to properly adjust the block, the rear stirrup, Y, must be as much lower than the forward one, Z, as the difference in thickness of the two ends of the shingle. This difference in the height of the stirrups must now be overcome, that the rear end of the block, adjusted for the butt of the shingle, may pass undisturbed, to accomplish which is the object of the devices above described.

The adjustable stirrups, W X, have likewise a difference in height equal to the difference in thickness of the two ends of the shingle, but in this case, as the butt of the shingle is to be sawn from the forward end of the block, no further adjustment of the stirrups is required.

The planers C and D are so placed that the block reaches them after it has been adjusted for the next shingle, and in consequence, its lower surface is inclined to the horizontal surface of the planer, which latter may be set to meet the block at any given point in the incline.

Shingles made in this manner will be of even thickness where planed, the inclined part being left rough as it comes from the saw.

Having thus fully described our said invention,

What we claim as new, and desire to secure by Letters Patent, is—

1. The adjustable stirrups W X Y, and adjustable spring-stirrup Z, herein described, when constructed and operated substantially as and for the purpose set forth.

2. The inclined planes I I', &c., when constructed as described, and operated in combination with the spring-stirrup Z, substantially as set forth.

ADAM G. RITZ.
JOHN B. CARTER.

Witnesses:
WM. H. CARR,
JNO. B. ANDERSON.